UNITED STATES PATENT OFFICE 2,097,228

MILK SOLUBLE ALGINATE COMPOUND AND PROCESS

Howard J. Lucas, Pasadena, Calif., assignor to Kelco Company, Los Angeles, Calif., a corporation of Delaware No Drawing. Application July 2, 1934, Serial No. 733,530. Renewed June 3, 1937

34 Claims. (Cl. 99—24)

This invention is a new alginate compound and process of producing same.

The object of the invention is to produce an alginate compound which is readily soluble in milk for use in connection with dairy products.

A further object of the invention is to produce a readily soluble alginate compound useful in the industrial arts.

All alginates heretofore made, to the best of my knowledge and information, have been insoluble in milk or products containing milk. This is especially true of the high viscosity alginates, even when mixed with a fairly large percentage of sugar and dried. Heretofore such alginates, or mixtures thereof, although finely ground will not completely dissolve when added to milk, at room temperature, at 180° F., or at intermediate temperatures, but the alginates remain suspended in the form of distinctly visible particles even after long and vigorous stirring. Consequently when such alginates were used in dairy products, it was necessary to first prepare a water solution of the alginate and add this to the milk. Thus in using alginates in chocolate milk drinks the alginate had to be first dissolved in water, then cocoa added, and then the other ingredients such as sugar, malt, flavoring, etc., to make a syrup, and then add such syrup to the milk in the proportions desired. Also when alginates were to be used in ice creams, the alginate had to be first dissolved in water and then added to the ice cream mix. Some manufacturers of ice cream object to any addition of water to their mixture and therefore, cannot use alginate in their ice cream. Similarly, heretofore alginates for use in buttermilk and other dairy products had to be first dissolved in water. The necessity for first making water solutions of the alginates not only involved expense and time in preparing the final drink or edible, but in some cases the water affected the quality; and special equipment was involved and many dairies lacking such equipment have been unable to use alginates for the above reasons.

My novel product more specifically consists of a relatively dry soluble alginate compound which may be dissolved directly in milk, or products containing milk, without preliminary dissolving in water or special handling such as heretofore required; and without any special equipment; and solutions of my novel product in milk can be made in the usual pasteurizing vats.

One practical method of manufacturing my novel milk soluble alginate compound is as follows: A quantity of alginic acid (preferably such as disclosed in Thornley-Walsh Patent No. 1,814,981, July 14, 1931; and Clark-Green application Serial No. 693,891, filed October 16, 1933, and Green application Serial No. 721,829, filed April 21, 1934, which usually contains about 85% to 90% water and has a fibrous character) is placed in a suitable mixer.

Enough soda ash is then added to the alginic acid to produce, when thoroughly mixed therewith, a sodium alginate paste of about 7 pH. Preferably the soda ash is dusted into the mixer to aid in uniformly distributing it throughout the mass. In place of soda ash other neutralizing agents, such as sodium bicarbonate and sodium hydroxide may be used. The mixing is continued long enough (usually about 20 minutes) to insure conversion of all the alginic acid into a sodium alginate paste.

To this paste is then added a phosphate (preferably trisodium phosphate) or similar material. The anhydrous weight of such trisodium phosphate is approximately equal to ⅛ of the anhydrous weight of the alginic acid. This trisodium phosphate is added in dry form $$(Na_3PO_4.12H_2O \text{ or } Na_3PO_4.H_2O)$$

and mixed into the paste until it has thoroughly dissolved and reacted; this ordinarily occurs in about ten minutes time. When milk powder or other suitable drying agent is employed, it is added in a similar manner to the phosphate. When sugar, or other suitable agent for increasing solubility and for controlling the colloidal efficiency of the product, is used, it is added in a similar manner to the phosphate.

The resultant mixture is then spread onto trays and dried. If dried in the sun one to three days' time is required depending on the weather conditions. It may be dried artificially by means of a drum dryer, spray dryer, mechanical tray belt tunnel dryer, or other suitable means. In some cases it has been found desirable to add milk powder to this mixture to assist in drying during the manufacture of the dry soluble compound. The addition of milk powder or other suitable agent to the mixture before drying greatly assists the drying.

The dried material, which may contain about 10–15% water, is then ground and screened to a convenient size for marketing. The product may be of any suitable size. Preferably the dried material is reduced to a size which will pass through a 20 mesh screen and over an 80 mesh screen. The smaller the particle size the faster the solution rate when the particles are dispersed in milk. As too fine particles may tend to cake prior to use, I usually remove the finest particles (at present those which pass through an 80 mesh screen) and place them in the mixer with the alginic acid and soda ash in the initial step of preparing more of my product, this disposes of such fines and they aid in thickening the paste so that it will dry faster.

For a thoroughly milk soluble alginate the pH of the finished product in a 1% water solution would preferably be above 7.5; and the more the pH increases the quicker the product will go into solution in milk.

For practical purposes the minimum ratio of trisodium phosphate (anhydrous) to the anhydrous alginic acid should be about 1:16. When smaller concentrations are used the product eventually goes into solution, but not in the normal pasteurizing time employed by dairies.

I have found that a mechanical mixture of dry sodium phosphate and dry sodium alginate will not give the same result in that it will not dissolve in milk even though such ingredients were first finely ground and intimately mixed together; and also that the addition of dry sugar to said mixture will not render it soluble in milk.

Chocolate milk drinks may be prepared by adding my novel soluble alginate compound to the milk in the pasteurizing vat and stirring normally until it is dissolved, then the desired amount of cocoa and finally the sugar and other ingredients. After pasteurization is complete the drink may be cooled, held and bottled in the usual manner. My novel soluble alginate compound may also be added directly to an ice cream mix while stirring it in the pasteurizing vat.

The above described process may be varied as follows and still give a milk soluble alginate compound: Refined alginic acid made by any process may be used. The salts of the alginic acid may have high or low viscosity, although a greater suspending power towards cocoa is obtained when a high viscosity alginic acid is used. The acid does not have to be free of all insoluble alginic acid salts such as calcium or aluminum salts, as such salts will react with the trisodium phosphate to form the corresponding insoluble phosphate and soluble sodium alginate. The effectiveness of high-ash alginic acid is increased by the addition of the trisodium phosphate.

A soluble alginate such as ammonium, potassium or magnesium alginate, or any other suitable water soluble alginate, or any combination of these, may be incorporated in a paste form with trisodium phosphate to obtain the milk soluble phospho-alginate compound.

When soluble alginates other than sodium alginate are to be incorporated, the corresponding carbonates, bicarbonates or hydroxides may be added for neutralizing the alginic acid.

In place of trisodium phosphate other phosphates may be used, such as disodium phosphate, monosodium phosphate, or combinations of these. Phosphoric acid also may be used, or any combination of it with the above salts. Soluble phosphates other than those of sodium may also be used. Sodium hydroxide or other strongly basic substance may also be used in conjunction with these compounds in order to bring the pH to the desired value. In such case the phosphates may be added to the alginic acid before the carbonates. The sodium hydroxide or other strongly basic substance may be added previous to, during and/or subsequent to the incorporation of the phosphoric compound with the alginic compound.

I have also found that sodium casein and also milk powder may be used in place of phosphates. These materials also have the added advantage of thickening the paste and thereby aid in drying. It is probable that the milk powder renders the compound soluble due to the presence of sodium caseinate in the milk. The milk powder also increases the solubility rate of the product similar to sugar.

It must be remembered, however, that the ratio of the amount of substitutes used for trisodium phosphate will necessarily have a different effective minimum ratio to the alginic acid content than the trisodium phosphate. The substitution may be complete or partial or made with several different substitutes.

The product may be a sodium phospho-alginate, or as hereinafter described may consist of a compound of sodium alginate and the sodium salt of an acid whose calcium salt is insoluble in water, such as sodium silicate, sodium citrate, sodium tartrate, sodium carbonate, sodium caseinate, according to the specific chemicals employed. In lieu of the sodium compounds mentioned above, the corresponding potassium and ammonium salts and other water soluble salts which do not form a precipitate with sodium alginate may be used.

Sodium hydroxide or other strong base may be used when it is desired to regulate or increase the pH of any product.

Instead of using the phosphates, milk powder, sugar, etc., in the dry form they may be mixed with water before incorporating with the alginic compound.

If desired substances to increase the rate of drying and subsequent solution, such as sugars, milk powder, and sodium chloride, may be added before drying the sodium phospho-alginate.

My new product is not only superior to sodium alginate in its solubility in milk, but also increases the effectiveness of the contained sodium alginate in its ability to suspend cocoa. I have demonstrated this by the following test: A sodium alginate and sugar mixture was made and dried; also a phospho-alginate was made from the same lot of alginic acid. These two products were then dried, ground and used to make a non-settling chocolate milk drink. In the one containing phospho-alginate 20% less alginate was required to suspend the cocoa than was required with the sodium alginate-sugar. When a chocolate milk was made by suspending cocoa in milk in which phospho-alginate had previously been added without first dissolving it in water, 27% less alginate was required than in a chocolate milk where the alginate-sugar mixture was first dissolved in water. The alginate-sugar mixture could not be tested directly in milk as it would not dissolve therein.

My new milk soluble alginate products substantially increase the effectiveness of the contained sodium alginate in its ability to stabilize ice cream.

My milk soluble alginate product is also useful to producers of dry milk powder, as it can be used by dissolving the dry compound in the milk before drying, whether such milk be skim-milk, whole milk, or milk of any butter fat in between these limits. My product is also useful in dry ice cream mix powders as it can be dissolved in the ice cream mix before drying. Any form of drying could be used, the methods commonly used for this purpose are spray drying and drum drying. In each of these cases the resulting dry product will be stabilized when reconstituted in water or milk. Due to the small amount of the new product required in commercial use and to the buffer effect of milk, the pH of the milk after the new product is in solution is substantially unchanged.

To the various grades of reconstituted milk containing my milk soluble product can be added cocoa or chocolate and sugar to form a completely suspended chocolate milk. All grades of reconstituted milk containing my milk soluble product can be used like ordinary grades of reconstituted milk, or the corresponding grades of fresh milk, as an ingredient in an ice cream mix and to such mix it would be unnecessary to add separately any stabilizer. In the same way dry ice cream mix powder containing my milk soluble product could be reconstituted in water, milk or other dairy product to form a complete wet ice cream mix ready for freezing to produce ice cream.

My new milk soluble alginate product may be added dry, or in the form of a water solution, to chocolate liquor or a water solution of cocoa either during the processing of the cocoa, or to a reconstituted water solution of finished cocoa; and these wet mixtures can be dried to produce a dry non-settling cocoa powder; such powder can be added to water and sugar to form a non-settling syrup which can be added to milk to form a non-settling chocolate milk; or such powder can be added to hot milk and sugar to form a non-settling chocolate milk without the necessity of first going through the step of making a syrup.

Another characteristic by which my new milk soluble product differs from sodium alginate, or mixtures of sodium alginate and sugar, is that it can be mixed with sugar, cocoa, chocolate and flavoring in dry form to produce a compound which when added to hot milk will make a non-settling chocolate milk drink. Such compound could first be added to water to form a syrup if desired, which syrup could be added to hot milk to form a non-settling drink. Dry milk powder of any butter fat content could be added to the aforesaid compound, and by adding such mixture to water a non-settling chocolate milk can be produced. So far as I am advised or can ascertain no suspending agent or stabilizer ever before known could be used as hereinbefore described to produce a non-viscous non-settling chocolate milk.

My soluble alginate products are also useful in many other industrial arts, and are more effective on an alginate content basis than alginate salts alone. And my soluble products are particularly useful for creaming latex, and may also be used in boiler compounds, automobile polishes, and emulsifying oils.

I claim:—

1. A soluble compound comprising an alginate and a water soluble salt of an acid whose calcium salt is insoluble in water.

2. A soluble compound comprising an alginate and sodium salts of an acid whose calcium salt is insoluble in water.

3. A soluble phospho-alginate compound.

4. A soluble alginate compound comprising a water soluble salt of alginic acid and a sodium phosphate.

5. A soluble compound comprising a water soluble salt of alginic acid and phosphoric acid.

6. A soluble compound comprising sodium alginate and sodium salts of an acid whose calcium salt is insoluble in water.

7. A soluble phospho-alginate compound having a pH of over 7.5.

8. A soluble alginate compound comprising an alginate and a salt of an acid whose calcium salt is insoluble in water, having a pH of over 7.5.

9. A soluble alginate compound comprising a salt of alginic acid and sodium phosphate, and having a pH of over 7.5.

10. A soluble alginate compound comprising a salt of alginic acid and trisodium phosphate, and having a pH of over 7.5.

11. A soluble alginate compound comprising a soluble salt of alginic acid, a phosphate, and a milk powder.

12. A soluble alginate compound comprising a salt of alginic acid, sodium phosphate, and a milk powder.

13. A dry soluble compound comprising a water soluble salt of alginic acid, a water soluble salt of an acid whose calcium salt is insoluble in water, and a milk powder.

14. A dry soluble compound comprising sodium alginate, sodium salts of an acid whose calcium salt is insoluble in water, and a milk powder.

15. A soluble alginate compound comprising a soluble alginate and a phosphate.

16. A soluble alginate compound comprising a soluble alginate and trisodium phosphate.

17. A soluble alginate compound comprising a soluble alginate and sodium caseinate.

18. A soluble alginate compound comprising a soluble alginate and milk powder.

19. A soluble alginate compound, comprising an alginate, a salt of an acid whose calcium salt is insoluble in water, and sodium hydroxide to control the pH value.

20. The herein described process of producing a milk soluble alginate compound; consisting in mixing alginic acid and a neutralizing agent until the mass is converted into a paste, then adding sodium salts of an acid whose calcium salt is insoluble in water, and agitating the mixture until it has reacted; drying the mixture; and comminuting the dried material.

21. The herein described process of producing a soluble phospho-alginate compound, consisting in mixing alginic acid and a neutralizing agent until the mass is converted into a paste; then adding a phosphate, agitating the mixture until it has reacted; drying the mixture, and comminuting the dried material.

22. The herein described process of producing a soluble alginate compound, consisting in mixing alginic acid and a neutralizing agent until the mass is converted into a paste, then adding caseinate, stirring the mixture until it reacts; drying the mixture; and comminuting the dried material.

23. The herein described process of producing a soluble phospho-alginate compound, consisting in mixing alginic acid and a neutralizing agent until the mass is converted into a paste, then adding sodium phosphate, and stirring the mixture until it has reacted; drying the mixture; and comminuting the dried material.

24. The herein described process of producing a soluble alginate compound, consisting in mixing alginic acid and soda ash until the mass is converted into sodium alginate, then adding salts of an acid whose calcium salt is insoluble in water, and agitating the mixture until it has reacted;

drying the mixture; and comminuting the dried material.

25. The herein described process of producing a soluble phospho-alginate compound, consisting in mixing alginic acid and soda ash until the mass is converted into sodium alginate, then adding sodium phosphate, agitating the mixture, drying the mixture, and finally comminuting the dried material.

26. That step in producing a stabilized milk powder consisting in adding to milk before drying a milk soluble alginate compound.

27. The herein described process of producing a soluble alginate compound, consisting in mixing sodium hydroxide and an alginate, adding a salt of an acid whose calcium salt is insoluble in water, drying the mixture and comminuting the dry material.

28. The herein described process of producing a soluble alginate compound, consisting in mixing an alginic acid and a salt of an acid whose calcium salt is insoluble in water, adding a neutralizing agent and sodium hydroxide to control pH, stirring the mixture until it has reacted, drying the mixture, and comminuting the dry material.

29. A soluble alginate product compounded of an alginate, a phosphate and a strongly basic substance.

30. The method of preparing a soluble alginate compound, consisting in mixing an alginic compound, a phosphoric compound, and a strongly basic substance, and drying the mixture.

31. The herein described process of producing a milk soluble alginate compound; consisting in mixing alginic acid with a neutralizing agent until it has reacted, adding a soluble salt of an acid whose calcium salt is insoluble in water, adding a strong base to control the pH, stirring the mixture, drying the mixture and comminuting the dry material.

32. The herein described process of producing a milk soluble alginate compound; consisting in mixing alginic acid with a neutralizing agent until it has reacted, adding the soluble salts of acids whose calcium salts are insoluble in water, stirring the mixture, drying the mixture and comminuting the dry material.

33. The herein described process of producing a milk soluble alginate compound; consisting in mixing alginic acid and an acid whose calcium salt is insoluble in water with a neutralizing agent until it has reacted, drying the mixture and comminuting the dry material.

34. The herein described process of producing a milk soluble alginate compound; consisting in mixing alginic acid and an acid whose calcium salt is insoluble in water with a neutralizing agent until it has reacted, adding sodium hydroxide to regulate the pH, drying the mixture and comminuting the dry material.

HOWARD J. LUCAS.